(12) United States Patent
Wheatley et al.

(10) Patent No.: US 9,361,005 B2
(45) Date of Patent: Jun. 7, 2016

(54) METHODS AND SYSTEMS FOR SELECTING MODES BASED ON THE LEVEL OF ENGAGEMENT OF A USER

(71) Applicant: United Video Properties, Inc., Santa Clara, CA (US)

(72) Inventors: David John Wheatley, Tower Lakes, IL (US); William J. Korbecki, Crystal Lake, IL (US); Brian Craig Peterson, Barrington, IL (US)

(73) Assignee: Rovi Guides, Inc., San Carlos, CA (US)

( * ) Notice: Subject to any disclaimer, the term of this patent is extended or adjusted under 35 U.S.C. 154(b) by 123 days.

(21) Appl. No.: 14/141,664

(22) Filed: Dec. 27, 2013

(65) Prior Publication Data

US 2015/0185993 A1 Jul. 2, 2015

(51) Int. Cl.
*G06F 3/00* (2006.01)
*G06F 3/0484* (2013.01)
*G06F 3/01* (2006.01)
*H04N 21/47* (2011.01)

(52) U.S. Cl.
CPC .............. *G06F 3/0484* (2013.01); *G06F 3/013* (2013.01); *H04N 21/47* (2013.01)

(58) Field of Classification Search
CPC ...................................................... G06F 3/012
See application file for complete search history.

(56) References Cited

U.S. PATENT DOCUMENTS

| | | | |
|---|---|---|---|
| 8,473,975 B1* | 6/2013 | Besehanic | 725/10 |
| 8,943,526 B2* | 1/2015 | Rivera et al. | 725/10 |
| 8,959,541 B2* | 2/2015 | Conrad et al. | 725/12 |
| 2002/0120925 A1 | 8/2002 | Logan | |
| 2003/0052911 A1* | 3/2003 | Cohen-solal | 345/738 |
| 2006/0093215 A1* | 5/2006 | Paschalakis et al. | 382/173 |
| 2006/0190822 A1* | 8/2006 | Basson et al. | 715/700 |
| 2009/0048908 A1* | 2/2009 | Kaplan et al. | 705/10 |
| 2010/0205667 A1 | 8/2010 | Anderson et al. | |
| 2012/0124604 A1* | 5/2012 | Small et al. | 725/12 |
| 2013/0159876 A1 | 6/2013 | Narasimhan et al. | |
| 2013/0212501 A1* | 8/2013 | Anderson et al. | 715/764 |
| 2014/0047464 A1* | 2/2014 | Lev et al. | 725/12 |
| 2014/0282669 A1* | 9/2014 | McMillan | 725/19 |

FOREIGN PATENT DOCUMENTS

WO   WO2009/033187   3/2009

\* cited by examiner

*Primary Examiner* — Omar Abdul-Ali
(74) *Attorney, Agent, or Firm* — Ropes & Gray LLP

(57) ABSTRACT

Methods and systems are disclosed herein for a media guidance application that adjusts modes based on actively determining an engagement level of a user. In such modes both the content presented and the interactions of a user that are recognized may be based on the level of engagement of the user.

18 Claims, 9 Drawing Sheets

METHODS AND SYSTEMS FOR SELECTING MODES BASED ON THE LEVEL OF ENGAGEMENT OF A USER

BACKGROUND

In many households, user devices such as television, computer, smartphones, etc. are left on at all times without anyone actively using the device. Because the content and modes of operation for these devices are typically geared towards interactive content (e.g., games, applications, menus, etc.), when a user is not actively using a device the efficiency of use of the device is significantly reduced. While many devices allow users to switch modes of a device (e.g., switching a smartphone into "airplane mode"), such devices require a user to manually activate and deactivate the various modes.

While some devices do enter different modes without user inputs (e.g., a computer entering a "stand-by" mode in which a screen saver is displayed), the ability of these devices is limited to pre-programmed settings that do not actively determine the engagement of the user. For example, while a screen saver may be activated after a predefined amount of time passes without a user input, this preprogrammed setting does not actively determine the engagement of the user (e.g., the user may be reading content on the display screen of the device that does not require a user input).

SUMMARY

Accordingly, methods and systems are disclosed herein for a media guidance application that adjusts modes based on actively determining an engagement level of a user. In such modes, both the content presented and the interactions of a user that are recognized may be based on the level of engagement of the user.

For example, the media guidance application may select one of a plurality of presentation modes based on the level of engagement of the user. For example, the media guidance application may generate a first (e.g., "active") presentation mode that features interactive content, complex menus, and multiple user input interaction types (e.g., remote control, touch-screen, voice control, etc.) if a user is actively engaging a device associated with the media guidance application. The media guidance application may generate a second (e.g., "glance") presentation mode that features a ticker-feed, pop-up alerts, etc. with limited user input interaction types (e.g., voice control) if a user is only partially engaging (e.g., glancing at the device every so often) a device associated with the media guidance application. The media guidance application may also generate a third (e.g., "companion") presentation mode that features limited video (e.g., screen savers, information on audio currently playing, etc.) and audio content (e.g., background music) and no user input interaction types (e.g., the media guidance application will need to switch to a different presentation mode in order to recognize any inputs) if a user is not engaging a device associated with the media guidance application.

In some aspects, the media guidance application generates a first presentation mode associated with a first composite engagement level. The media guidance application then receives engagement indicia of the user and quantifies each of the engagement indicium according to respective metrics to determine engagement levels based on each engagement indicium. The media guidance application then computes a second composite engagement level for the user based on the engagement levels associated with each engagement indicium and compares the second composite engagement level to a threshold engagement level. In response to determining that the second composite engagement level corresponds to the threshold engagement level, the media guidance application replaces the first presentation mode with a second presentation mode associated with the second composite engagement level.

In some embodiments, the first presentation mode and the second presentation mode are associated with different audio and/or video presentation capabilities with a display of different media assets based on the different audio and/or video presentation capabilities. For example, the first presentation mode may generate a display of feature-length films in high resolution, while the second presentation mode may only generate a display of text associated with ticker feed featuring updates from social media accounts associated with the user.

In some embodiments, the media guidance application may also generate transition information including content being presented in the first presentation mode when the first presentation mode is replaced with a second presentation mode, a length of time that the first presentation mode was active, or a time of day when the first presentation mode is replaced with a second presentation mode and transmit the transition information to a remote server. For example, the transition information may then be used by an advertiser or other entity to target advertisements, rate content, or provide a user recommendation.

In some aspects, the media guidance application may recognize a first type of user input interaction associated with a first composite engagement level. The media guidance application may receive engagement indicia of the user and quantify each of the engagement indicium according to respective metrics to determine engagement levels based on each of the engagement indicium. The media guidance application may then compute a second composite engagement level for the user based on the engagement levels associated with each of the engagement indicium and compare the second composite engagement level to a threshold engagement level. In response to determining that the second composite engagement level corresponds to the threshold engagement level, the media guidance application recognizes a second type of user input interaction associated with the second composite engagement level without recognizing the first type of user input interaction.

In some embodiments, the first type of user input interaction is associated with selections requiring physical contact with a user input interface and the second type of user input interaction is associated with selections not requiring physical contact such as voice commands. For example, when recognizing the first type of user input interaction, the media guidance application may only recognize user inputs (e.g., with traditional buttons, motion-controls, touch-screen, etc.) received via physically contacting a remote control or other user device associated with the media guidance application. Alternatively, when recognizing the second type of user input interaction (e.g., while a ticker feed featuring updates from social media accounts associated with the user is presented), the media guidance application may only recognize user inputs (e.g., voice-control, motion-sensors, etc.) received without physically contacting a remote control or other user device associated with the media guidance application.

In some aspects, the media guidance application may use a variety of techniques for receiving engagement indicia of a user, quantifying each of the engagement indicia, computing a composite engagement level, and comparing the composite engagement level to a threshold engagement level. For example, in some embodiments, when quantifying each of the engagement indicia according to respective metrics to determine engagement levels based on each engagement indicia, the media guidance application may select different respective metrics for each of the engagement indicium. For example, the metric used by the media guidance application to quantify a first engagement indicium (e.g., eye contact of the user) may include measuring a length of time that the user is making eye contact with the display of a first media asset during a period of time, whereas the metric used by the media guidance application to quantify a second engagement indicium (e.g., an amount of user inputs) may include a number of times that the user enters a user input during the period of time.

In some embodiments, the metrics may measure the engagement level of a user or users with respect to one or more devices. For example, the media guidance application may determine how engaged a user is with media content being presented on a television or computer. In some embodiments, the metrics used by the media guidance application to quantify engagement indicia may be calibrated by the media guidance application for individual users. For example, a user profile of typical actions of the user may be referenced when determining whether or not the user is actually engaged.

In some embodiments, the media guidance application may cross-reference a user action in a database associated with contexts of user actions to determine whether a context associated with the user action indicates that the user action corresponds to one or more of the engagement indicia. For example, the media guidance application may cross-reference spoken words by the user to determine whether the words relate to content generated for display by the media guidance application (e.g., an indicator that the user is more engaged) or do not relate to content generated for display by the media guidance application (e.g., an indicator that the user is less engaged).

In some embodiments, the media guidance application may determine a likelihood that the context associated with the user action indicates how the user action corresponds to the one or more of the engagement indicia and comparing the likelihood to a threshold likelihood. In response to determining that the likelihood does not correspond to the threshold likelihood, the media guidance application may determine the context associated with the user action does not indicate how the user action corresponds to one or more of the engagement indicia. For example, the media guidance application may determine whether it is more likely that a user is using a second device to view information related to content generated for display by the media guidance application on a first device (e.g., an indicator that the user is more engaged) or that the user is using the second device to view information that is not related to content generated for display by the media guidance application on the first device (e.g., an indicator that the user is less engaged).

In some embodiments, the media guidance application may also generate transition information including content being generated while the first type of user input interaction is recognized, when the first type of user input interaction is recognized instead of the second type of user input interaction, a length of time that the first type of user input interaction is recognized, or a time of day when the first type of user input interaction is recognized instead of the second type of user input interaction and transmit the transition information to a remote server. For example, the transition information may then be used by an advertiser or other entity to target advertisements, rate content, or provide user recommendation.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
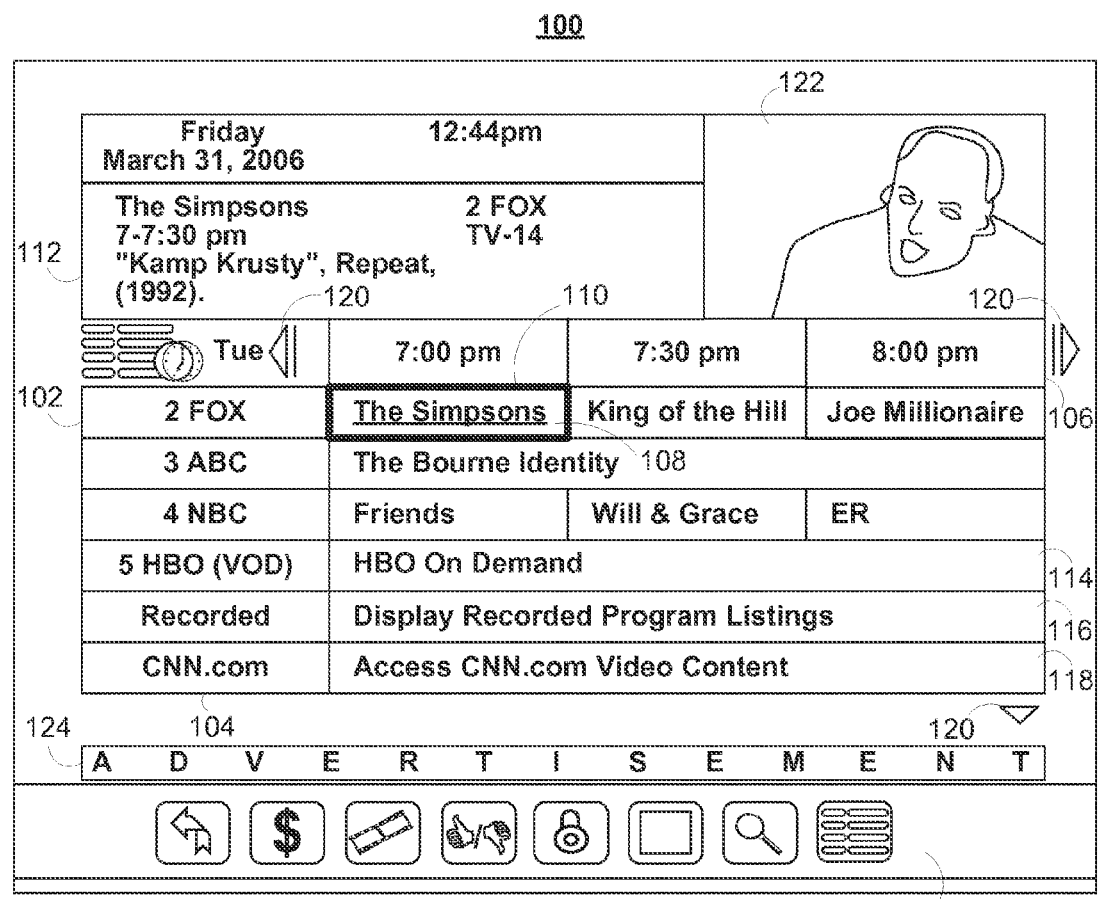
FIG. 1 is an illustrative display of a media guidance application in accordance with some embodiments of the disclosure.

Methods and systems are disclosed herein for a media guidance application that adjusts modes based on actively determining an engagement level of a user. In such modes both the content presented and the interactions of a user that are recognized may be based on the level of engagement of the user. As referred to herein, "a media guidance application," "interactive media guidance application," or "guidance application," is an application that allows, via an interface, users to efficiently navigate, view, share, and/or edit media content. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer-readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor caches, Random Access Memory ("RAM"), etc.

As referred to herein, "a mode" or "a presentation mode" refers to an operational state of the media guidance application. In some embodiments, the mode of a media guidance application may include a plurality of modes. Each of the plurality of modes may be associated with distinctive content and/or audio and/or video presentation capabilities as well as the types of user input interactions that are recognized by the media guidance application. For example, the various modes of the media guidance application may include a first mode that is associated with a large variety and amount of content, and/or content types, higher quality audio and/or video presentation capabilities, and multiple types of user input interactions that are recognized, and other modes that are associated with a more limited variety and amount of content, and/or content types, lower quality audio and/or video presentation capabilities, and fewer types, if any, of user input interactions that are recognized.

In some embodiments, a mode may be associated with a particular type of user input interaction. As used herein, a "type of user input interaction" refers to any means, or grouping of means, for interacting with media objects presented by the media guidance application. For example, a user input interaction type may refer to either an input device (e.g., remote control, mouse, trackball, keypad, keyboard, touch screen, touchpad, stylus input, joystick, voice recognition interface, joy-stick, game controller, image recognition interface, motion-sensing and/or motion-control interface, and/or other user input interface) or may refer to actions performed on input devices (e.g., single or double clicks, press-and-holds, motion-controls, including particular motions, touch-screen operations, including, but not limited to, swipes, drag-and-drops, pinch-and-expand, stylus inputs, video/audio/voice recognition, text entry, etc.).

In some embodiments, user input interaction types may be grouped or associated with a mode based on a variety of criteria. For example, the media guidance application may assign user input interaction types based on the content presented during operation in that mode. For example, a first presentation mode may provide interactive content (e.g., menus) that requires a variety of inputs (e.g., navigation inputs, selection inputs, volume inputs, etc.). Accordingly, the media guidance applications may select a type of user input interaction that reflects the need for a variety of inputs (e.g., remote controls, touchscreens, mice, trackballs, keyboards, etc.) and a variety of actions to be performed (e.g., single or double clicks, press-and-holds, etc.). In contrast, a second presentation mode may provide limited content (e.g., audio only) that does not require a variety of inputs. Moreover, the media guidance application may wish to reduce false-positive inputs that may erroneously affect the mode, content, etc. associated with the media guidance applications (e.g., a user accidentally affecting a device by touching a key on a keyboard while not engaged with that device) by disabling unnecessary inputs and types of inputs.

For example, when recognizing the first type of user input interaction, the media guidance application may only recognize user inputs (e.g., with traditional buttons, motion-controls, touch-screen, etc.) received via physically contacting a remote control or other user device associated with the media guidance application. Alternatively, when recognizing the second type of user input interaction (e.g., while a ticker feed featuring updates from social media accounts associated with the user is presented), the media guidance application may only recognize user inputs (e.g., voice-control, motion-sensors, etc.) received without physically contacting a remote control or other user device associated with the media guidance application.

For example, the media guidance application may generate a first (e.g., "active") mode that features interactive content, complex menus, and multiple user input interaction types (e.g., remote control, touch-screen, voice control, etc.). The media guidance application may generate a second (e.g., "glance") mode that features a ticker-feed, pop-up alerts, etc. with limited user input interaction types (e.g., voice control). The media guidance application may also generate a third (e.g., "companion") mode that features limited video (e.g., screen savers, information on audio currently playing, etc.) and audio content (e.g., background music) and no user input interaction types (e.g., the media guidance application will need to switch to a different presentation mode in order to recognize any inputs).

The media guidance application may select a mode from a plurality of modes, transition from one mode to another, and/or modify a particular mode, or the characteristics associated with that mode, based on the engagement level of one or more users. For example, the media guidance application may generate a first (e.g., "active") presentation mode if a user is actively engaging a device associated with the media guidance application. The media guidance application may generate a second (e.g., "glance") presentation mode if a user is only partially engaging (e.g., glancing at the device every so often) a device associated with the media guidance application. The media guidance application may also generate a third (e.g., "companion") presentation mode if a user is not engaging a device associated with the media guidance application. It should be noted that throughout this disclosure embodiments associated with determining the engagement of one user may be applied to determining the engagement of multiple users. For example, a composite engagement level associated with one user may equally be associated with multiple users by receiving engagement indicia from each user, determining the composite engagement level of each user, and determining a group composite engagement level (e.g., by averaging the engagement level of each user, or performing any other suitable operation, as discussed below).

As used herein, "an engagement level" of a user refers to a quantitative expression of the amount with which a user is consuming and/or interacting with content generated, delivered, facilitated by, and/or otherwise associated with a media guidance application. For example, an engagement level may measure the amount with which a user is using a user device (e.g., a television, computer, smartphone, etc.). It should be noted that throughout this disclosure embodiments associated with measuring the engagement of a user with respect to one device or media guidance application may also be applied to measuring the engagement of a user with respect to multiple devices or media guidance applications (e.g., via receiving engagement indicia of the user associated with multiple devices or media guidance applications).

To determine an engagement level of a user, the media guidance application may receive engagement indicia. As referred to herein, "engagement indicia" refers to any information monitored, received, and/or generated by the media guidance application that bears, whether directly or indirectly, on the engagement level of the user. For example, engagement indicia may relate to an amount of concentration or distraction associated with the user by indicating whether or not a user is making eye contact with the user device associated with the media guidance application, talking to other users and/or the context of the conversation, using other devices and/or the purpose related to the use of the other devices, comments, posts, and/or other transmissions via social media, etc. The engagement indicium may relate to physiological or psychological conditions of the user by indicating the current mood of the user (e.g., whether or not the user is bored, excited, angry, anxious, etc.), the current physical state of the user (e.g., whether or not the user is tired, sick, etc.), the current geographic location of the user (e.g., whether or not the user is present within a viewing area of a user device associated with the media guidance application), current actions of the user (e.g., whether or not the user is performing an activity that may affect the engagement of the user) as well as demographic, social, familial, or other profile information that may bear on the engagement of the user (e.g., what the user has previously viewed/purchased, what habits/customs are associated with the user, the amount or frequency of an activity at the current time etc.).

In some embodiments, the media guidance application receives engagement indicia of the user and quantifies each of the engagement indicium according to respective metrics to determine engagement levels based on each engagement indicium. As used herein, "a metric" refers to a standard or measurement associated with each engagement indicium used to compute an engagement level associated with each engagement indicium. For example, if the engagement indicium relates to whether or not a user is making eye contact with a user device associated with a media guidance application, the metric may correspond to the amount of time the gaze point of a user is focused on the user device versus the amount of time the gaze point is not focused on the user device. In another example, if the engagement indicium relates to whether or not a user is conversing about a media asset presented by the media guidance application, the metric may correspond to the percentage of a conversation of a user associated with the media asset.

In some embodiments, engagement indicia may include multiple metrics. For example, if the engagement indicium relates to whether or not a user is interacting with a user device associated with the media guidance application, one metric may correspond to a number of times a user enters a command on a user input interface during a predetermined amount of time. Another metric may correspond to whether or not a media asset currently presented by the user device requires user inputs (e.g., a typical user may enter commands into a word processing application while engaged more often than the user enters commands into a media player application). Yet another metric may correspond to the number of devices a user is currently engaged with (e.g., a user using three device concurrently may enter fewer commands into any one device than a user using only one device).

In some embodiments, a metric may be calibrated based on the user or current conditions. For example, the media guidance application may track a prior use history for the user to determine the typical amount of eye contact made while consuming media. The media guidance application may then compute any measurement based on the typical amount of eye contact such that a user with a prior use history of more eye contact is held to a higher standard than a user with a prior use history of less eye contact.

In some embodiments, measurements may be compared to particular thresholds. As referred to herein, a "threshold" refers to a particular quantity or qualities that cause the media guidance application to perform an action. For example, in response to determining that a composite engagement level corresponds to a threshold engagement level, the media guidance application may replace a first presentation mode with a second presentation mode. Likewise, in response to determining that the likelihood that a context associated with a user action indicates that the user action corresponds to one or more engagement levels does not correspond to a threshold likelihood, the media guidance application determines the context associated with the user action does not indicate that the user action corresponds to the one or more engagement indicia.

In some embodiments, the media guidance application may determine a composite engagement level. As used herein, "a composite engagement level" refers to an average of a plurality of engagement levels, in which each engagement level is associated with respective engagement indicia for a user. For example, if four engagement levels for a user, each associated with respective engagement indicia, correspond to one, one, two, and four, respectively, the media guidance application may determine that the composite engagement level corresponds to two. It should be noted that the arithmetic mean or average referred to herein, is but one way to determine a composite engagement level. Mathematical modes, medians, or other types of central or typical values may also be used.

In some embodiments, the media guidance application may also track current and prior use associated with the media guidance application to generate transition information. As used herein, "transition information" relates to any information related to the user circumstances surrounding a transition from one mode to another. For example, transition information may include, but is not limited to, content being presented in a first presentation mode when the first presentation mode is replaced with a second presentation mode or while the first type of user input interaction is recognized, a length of time that the first presentation mode was active or the first type of user input interaction is recognized, a time of day when the first presentation mode is replaced with a second presentation mode or the first type of user input interaction is recognized. For example, the transition information may then be used by an advertiser or other entity to target advertisements, rate content, or provide user recommendation.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1 and 2A-C show illustrative display screens that may be used to provide media guidance data. The display screens shown in FIGS. 1 and 2A-C may be implemented on any suitable user equipment device or platform. While the displays of FIGS. 1 and 2A-C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2A:
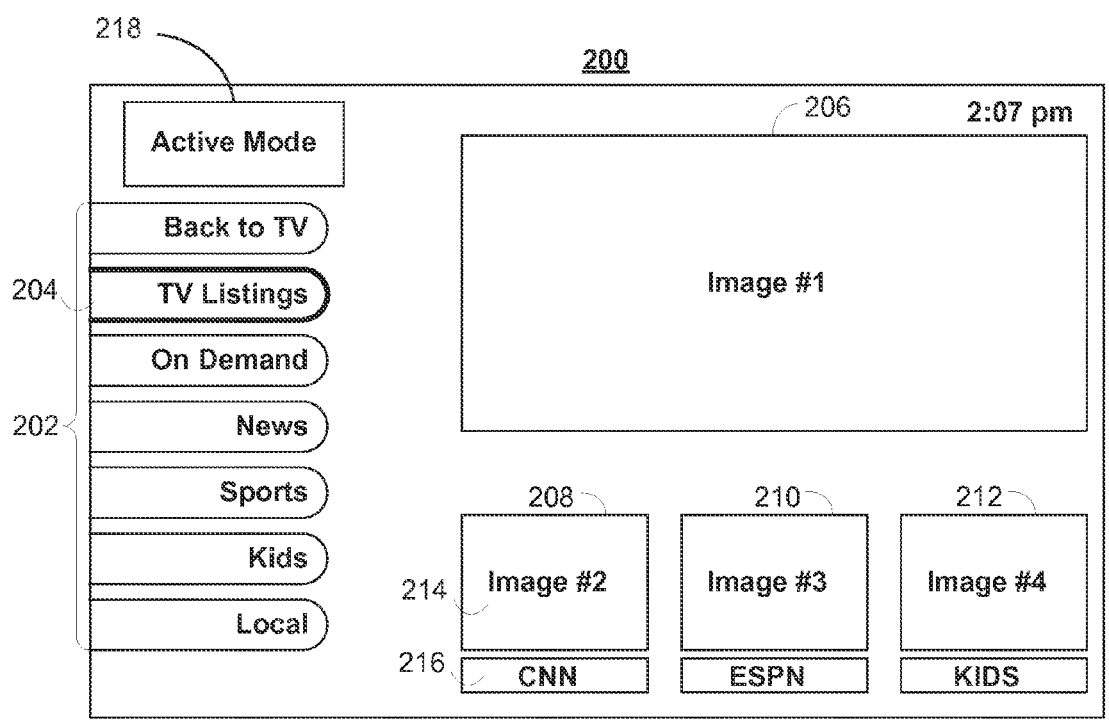
FIG. 2A is another illustrative display of a media guidance application in a mode in accordance with some embodiments of the disclosure.
Figure 2B:
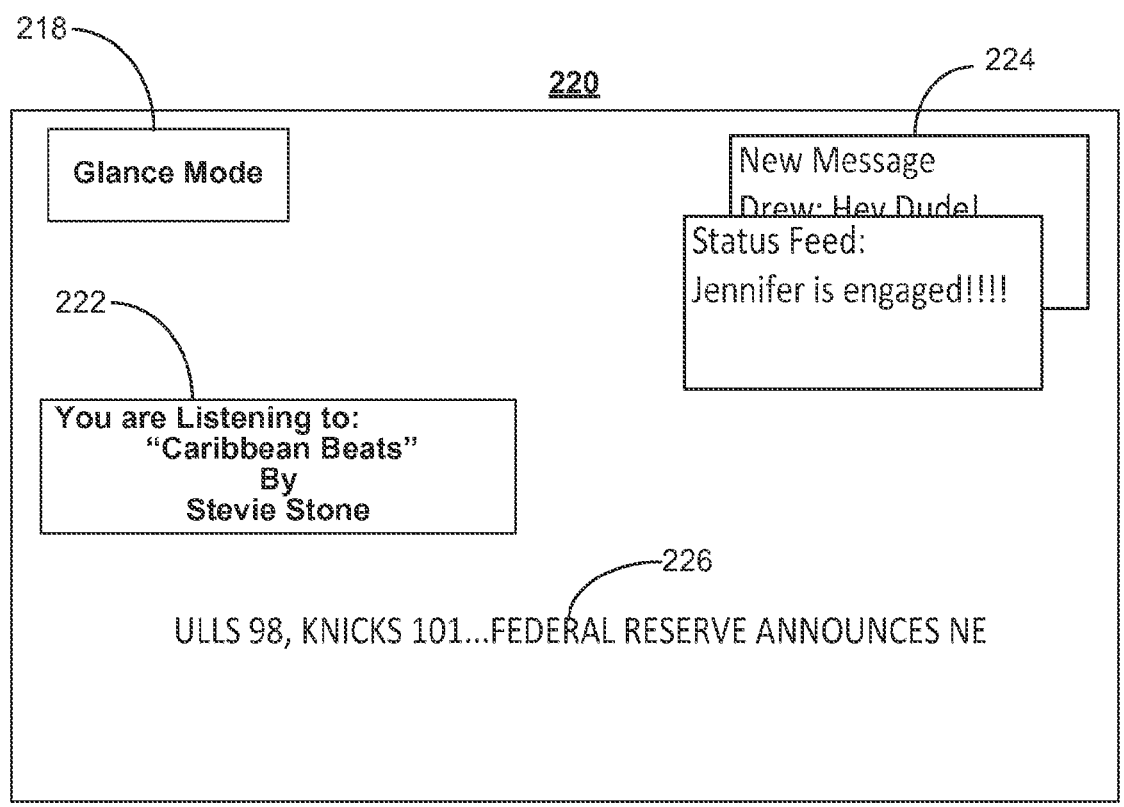
FIG. 2B is another illustrative display of a media guidance application in another mode in accordance with some embodiments of the disclosure.
Figure 2C:
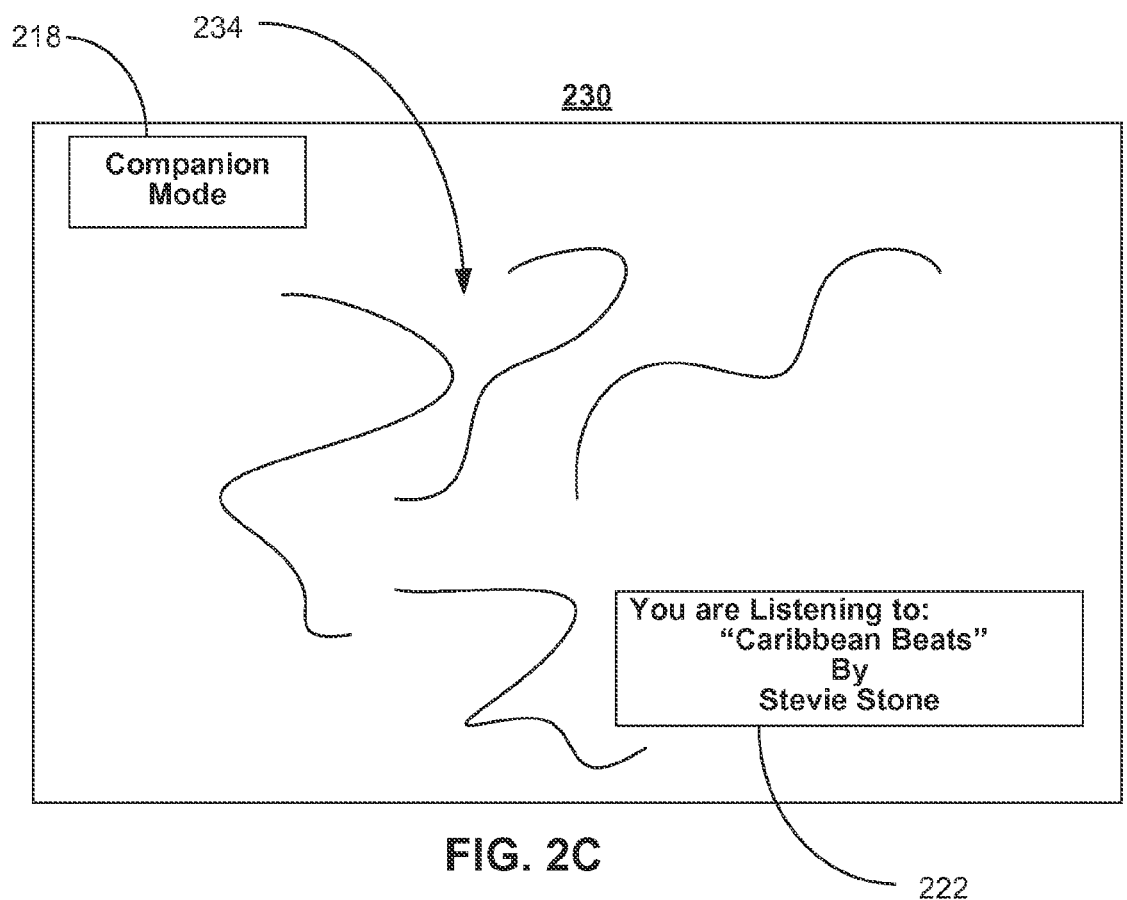
FIG. 2C is another illustrative display of a media guidance application in another mode in accordance with some embodiments of the disclosure.

Another display arrangement for providing media guidance is shown in FIGS. 2A-C. FIG. 2A is an illustrative display of a media guidance application. For example, in some embodiments, FIG. 2A may represent a presentation mode in which the media guidance application generates a presentation of content that is associated with high audio and/or video presentation capabilities as well as a wide variety of user input interaction types. For example, while in this presentation mode, the media guidance application may be capable of generating a display of feature-length films in high resolution, while recognizing all types of inputs.

In some embodiments, FIG. 2A may represent the media guidance application in a first (e.g., "active") presentation mode (e.g., as indicated by icon 218) that features interactive content, complex menus, and multiple user input interaction types (e.g., remote control, touch-screen, voice control, etc.) in response to determining that a user is actively engaging a device associated with the media guidance application (e.g., as determined based on a detection module 316 (FIG. 3) discussed below).

In FIG. 2A, video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Listings 206, 208, 210, and 212 and selectable options 202 may be navigated to/selected via user input received from a plurality of types of user input interaction. For example, as the user is actively engaged, the media guidance application may recognize any user input (e.g., as the risk of a false positive user input erroneously issued by an unengaged user is reduced).

Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

FIG. 2B is another illustrative display of a media guidance application in another mode. For example, in some embodiments, FIG. 2B may represent a presentation mode in which the media guidance application generates a presentation of content that has more limited audio and/or video presentation capabilities with less variety of user input interaction types. For example, while in this presentation mode, the media guidance application may be capable of generating a display of only textual messages with limited graphical features, while recognizing only certain types of inputs.

In some embodiments, FIG. 2B may represent the media guidance application in a second (e.g., "glance") presentation mode (e.g., as indicated by icon 218) that features no menus or interactive content, and generates textual alerts and updates instead. While in this presentation mode, the media guidance application may only recognize a few types of user input interaction (e.g., inputs to the physical buttons of a remote control) in response to determining that a user is passively engaging a device associated with the media guidance application (e.g., as determined based on a detection module 316 (FIG. 3) discussed below). In FIG. 2B, video mosaic display 220 includes textual pop-ups with limited graphical content.

For example, display 220 includes alerts 224, which indicate messages received (e.g., from one or more devices/accounts associated with a user) and status alerts/updates (e.g., from one or more devices/accounts associated with a user. For example, while in this mode, the media guidance application may generate for display status updates or other social sharing messages for a user that is passively engaging the user device associated with the media guidance application. As used herein, a "status update" refers to a brief message related to an interest of the user or and/or what another user has done, will do, or currently is doing. Status updates are typically associated with a social network. As used herein, a "social network," refers to a platform that facilitates networking, typically via a computer, and/or social relations among people who, for example, share interests, activities, backgrounds, and/or real-life connections.

For example, the media guidance application may display events (e.g., status updates, microblog posts, images, and/or graphic messages) posted on a server in which the server makes the event accessible to a second user. For example, the server may be a social media server owned/operated/used by social media provider that makes posting of a first event associated with a first user accessible to a second user that is within the same social network as the first user. As used herein, a "social media server" refers to a server that facilitates a social network. In some embodiments, the media guidance application may retrieve a list of other users that are associated with the user based on one or more criteria. For example, the media guidance application may retrieve a list of friends (e.g., a social network buddy list), contacts (e.g., retrieved from a phone/text message/e-mail account associated with the user), and/or other listings featuring other users associated with the user from a server or other device and generate a display of data (e.g., status updates) related to those other users.

In this presentation mode, the media guidance application may generate content that may be passively consumed by a user that may be focusing on other activities or devices. For example, in some embodiments, the media guidance application may automatically or in response to a user input present audio content to a user. For example, audio content may be passively engaged by a user, while the user is focusing on other activities and/or devices. As shown in display 222, the media guidance application has generated a display of icon 222, which indicates music that is currently playing.

Display 220 also includes ticker 226. In some embodiments, ticker 226 may be a traditional ticker as found on news programs, sporting events and other content that is part of a particular data feed. For example, each user that enters this presentation mode may see the same data.

In some embodiments, ticker 226 may be personalized. For example, the ticker and the content shown may be personalized by the provider of the data feed or by the media guidance application itself based on information associated with a user in a user profile. For example, the media guidance application may determine that football games are currently being broadcast (e.g., games that would be accessible in other presentation modes, but not in the current presentation mode). The media guidance application may generate an alert or reminder concerning the game. Alternatively or additionally, the media guidance application may generate ticker 226 showing scores or other information about the game (e.g., in response to determining that the user prefers a team in the game based on the user profile).

In another example, ticker 226 may not only show content relating to interests of a user, but may also show information about that content based on the user. For example, the media guidance application may generate a display of certain scores relating to fantasy sports leagues of the user or show specific stocks (e.g., found in a portfolio of the user) to the user during a finance news show.

In some embodiments, the media guidance application may even find sources of ticker 226 based on information about a user found in a user profile. For example, the media guidance application may determine social networks and/or other sources of content that may be relevant to a user and provide data feeds associated with those content sources. It should be noted that any information included in a user profile may be based on active monitoring (e.g., requesting the user enter information into a profile) or passive monitoring (e.g., tracking information about a user without the user making an explicit decision that it is being used to generate a user profile).

In FIG. 2B, the media guidance application may recognize only a specific type or types of user input interaction. For example, as the user is not actively engaged with the media guidance application (or the device associated with the media guidance application) the risk of a false positive user input (e.g., a user accidentally touching keys on a keyboard, accidentally activating a motion sensor, accidentally speaking a word that is interpreted as a voice command) is increased. Accordingly, the media guidance application may only recognize specific types of user input interaction.

For example, in this presentation mode, the media guidance application may not recognize input entered into a remote control, joystick, etc. associated with the media guidance application (or a user device associated with the media guidance application). For example, the media guidance application may only recognize limited motion sensor inputs. In such cases, higher motion control functions (e.g., waving a hand to change a channel) may be disabled, but lower motion control functions (e.g., detecting whether the user is present in or leaves a viewing area to determine whether to turn on or turn off a user device) may still be recognized. For example, to access the disabled higher functions, the media guidance application may first need to determine that the engagement level of the user has increased.

FIG. 2C is another illustrative display of a media guidance application in another mode. For example, in some embodiments, FIG. 2C may represent a presentation mode in which the media guidance application generates a presentation of content with a minimum of audio and/or video presentation capabilities and with a minimum variety of user input interaction types.

In some embodiments, FIG. 2C may represent the media guidance application in a third (e.g., "companion") presentation mode (e.g., as indicated by icon 218) that features no menus, interactive content, textual alerts, updates, or other content that would require the user to view or actively engage the media guidance application (or user device associated with the media guidance application). Instead, in this mode, content may be generated for system purposes (e.g., a screen saver to preserve the screen of a display device) as opposed to user purposes. While in this presentation mode, the media guidance application may only recognize minimal types of user input interaction (e.g., only an on/off button on a remote control) in response to determining that a user is not engaged with a device associated with the media guidance application (e.g., as determined based on a detection module 316 (FIG. 3) discussed below).

In FIG. 2C, video mosaic display 230 includes screensaver 234 and icon 222, which indicates music that is currently playing. In this presentation mode, the media guidance application may generate content that is not necessarily consumed by a user. For example, while in this presentation mode, the media guidance application may be capable of generating a display of only screen saving images and audio output (e.g., background music), while recognizing a minimal type of user input interaction. For example, in this presentation mode the risk of false-positive inputs is minimized. In order to perform other functions, the media guidance application may require the user to actively engage the media guidance applications before entering inputs or commands.

Figure 3:
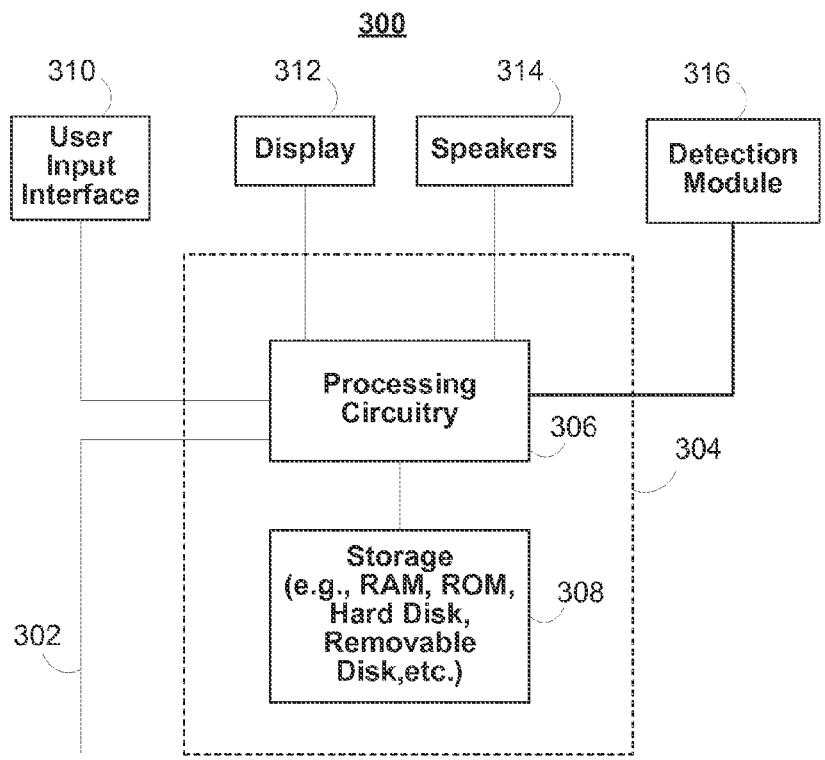
FIG. 3 is a block diagram of an illustrative system used in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, etc.). In some embodiments, detection module 316 may include components that are specialized to generate particular information (e.g., engagement indicia).

For example, as discussed below in relation to FIG. 5, detection module 316 may include an eye contact detection component, which determines or receives a location upon which one or both of a user's eyes are focused. The location upon which a user's eyes are focused is referred to herein as the user's "gaze point." In some embodiments, the eye contact detection component may monitor one or both eyes of a user of user equipment 300 to identify a gaze point on display 312 for the user. The eye contact detection component may additionally or alternatively determine whether one or both eyes of the user are focused on display 312 (e.g., indicating that a user is viewing display 312) or focused on a location that is not on display 312 (e.g., indicating that a user is not viewing display 312). In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, and may be a separate device or system in communication with user equipment device 300.

In some embodiments, detection module 316 may include a content recognition module. The content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the engagement of a user. For example, the media guidance application may receive data in the form of a video of the user. The video may include a series of frames. For each frame of the video, the media guidance application may use a content recognition module or algorithm to determine the people (including the actions associated with each of the people) in each of the frames or series of frames.

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the engagement of a user. For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation). Based on a combination of the data generated by the various detection module components, the media guidance application may compute an engagement level for the two people within the viewing area.

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be associated with data describing the engagement of the user and/or any other data required for the function of the embodiments described herein. Furthermore, the data could contain values (e.g., the data could be expressed in binary or any other suitable code or programming language).

In some embodiments, detection module 316 may also detect other user actions that may affect the engagement level of the user via one or more engagement indicia based on determining an interest of the user in content presented by the media guidance application. For example, if the media guidance application determines that a user is currently accessing another media asset on a second device, engagement indicia may indicate a higher or lower engagement level of the user. If the content of the second device is similar (e.g., relates to the same subject matter, product, genre, etc.) to the content associated with the media guidance application the net engagement of the user may increase. For example, the lower engagement level of the user (e.g., resulting from the user being distracted by the second device) may be compensated by the fact that the media guidance application can determine (e.g., via matching the content displayed on the first device to the content displayed on the second device) that the user is interested in the content of the first device. As the user is interested in the content associated with the media guidance application on the first device, the composite engagement level of the user increases.

The media guidance application (e.g., via detection module 316) may also verify a user interest through other means. For example, the media guidance application, using a detection module (e.g., detection module 316 (FIG. 3)), may query the search history associated with a search engine accessed from a second device (e.g., a smartphone or tablet computer) being used by a user within the viewing area of the display device associated with the media guidance application. Upon detecting that the user previously searched for information similar to the information currently presented by the media guidance application, the media guidance application may determine that the user in interested.

In another example, the media guidance application, using a detection module (e.g., detection module 316 (FIG. 3)), may analyze keywords within a conversation between users occurring within the viewing area of a display device. If any of the keywords describe an interest in the content presented by the media guidance application (e.g., as determined by a cross-reference with a database indicating words indicative of an interest in the content), the media guidance application may determine that the user has an interest in the content.

The media guidance application may also receive (e.g., via detection module 316 (FIG. 3)) user-generated data (e.g., status updates, microblog posts, etc.) describing a media asset and/or advertisement generated for display by the media guidance application. Information related to the user-generated data may constitute engagement indicia. For example, if a user posts an update to a social media website that he/she is currently enjoying a media asset, the media guidance application may receive engagement indicia that indicate a higher level of engagement. Likewise, if a user posts an update to a social media website that he/she is not currently enjoying a media asset (e.g., a post indicating the media asset is boring), the media guidance application may receive an engagement indicium that indicates a lower level of engagement.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
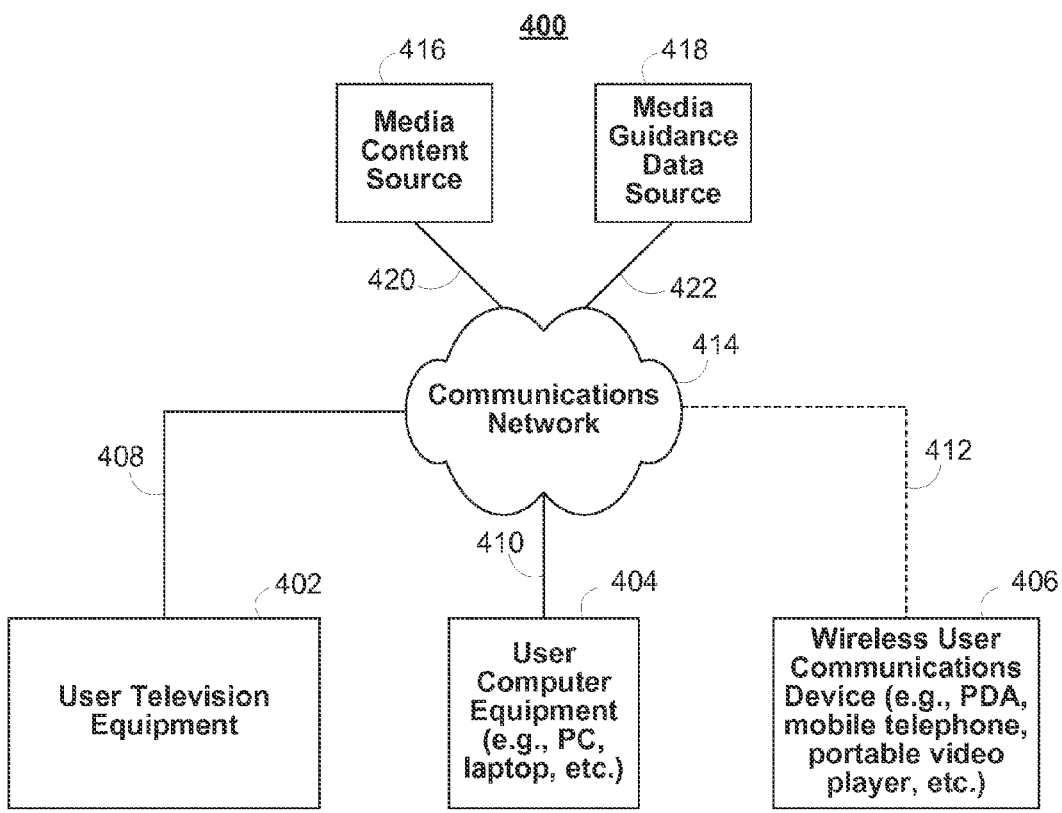
FIG. 4 is an illustrative diagram of a media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
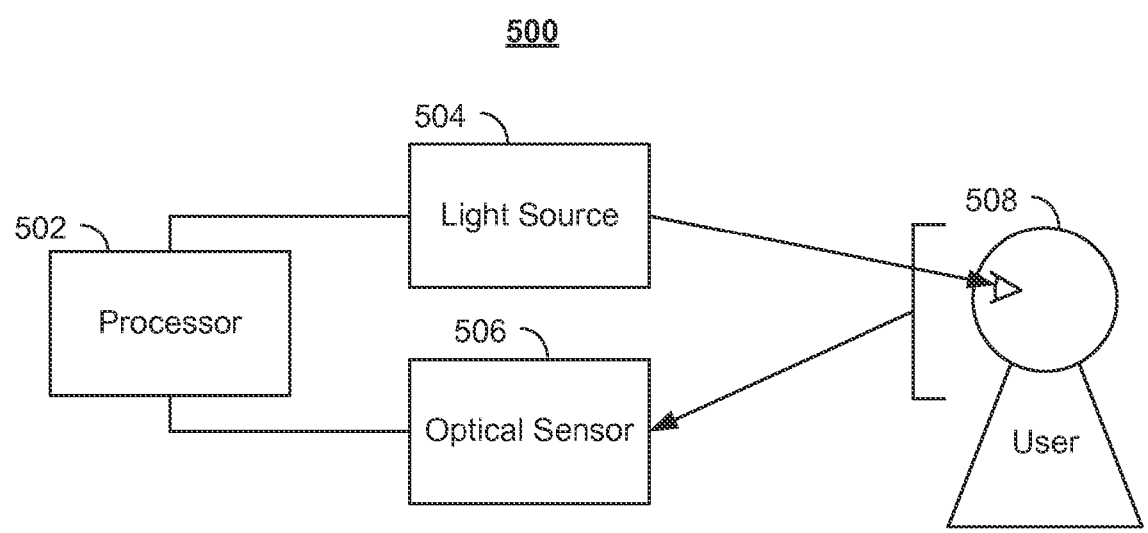
FIG. 5 is an illustrative example of a component used to detect engagement indicia related to a user in accordance with some embodiments of the disclosure.

FIG. 5 is an illustrative example of one component of a detection module (e.g., detection module 315 (FIG. 3)), which may be accessed by a media guidance application in accordance with some embodiments of the disclosure. FIG. 5 shows eye contact detection component 500, which may be used to identify the gaze point of a user of user equipment 300, in order to determine the engagement level of the user. Eye contact detection component 500 includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's gaze point.

In some embodiments, eye contact detection component 500 is configured for determining a gaze point of a single user. In other embodiments, eye contact detection component 500 may determine gaze points for a plurality of users.

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into a user device (e.g., user equipment device 300 (FIG. 3)).

Processor 502 may be similar to processing circuitry 306 (FIG. 3) described above. In some embodiments, processor 502 may be processing circuitry 306 (FIG. 3), with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e. a first Purkinje image), the reflection from the inner surface of the cornea (i.e. a second Purkinje image), the reflection from the outer (anterior) surface of the lens (i.e. a third Purkinje image), and/or the reflection from the inner (posterior) surface of the lens (i.e. a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e. corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point. Processor 502 may also store or obtain information describing the location of one or more light sources 504 and/or the location of one or more optical sensors 506 relative to a display (e.g., display 312 (FIG. 3)). Using this information, processor 502 may determine a user's gaze point on a display (e.g., display 312 (FIG. 3)), or processor 502 may determine whether or not a user's gaze point is the display (e.g., display 312 (FIG. 3)).

In some embodiments, eye contact detection component 500 performs best if the position of a user's head is fixed or relatively stable. In other embodiments, eye contact detection component 500 is configured to account for a user's head movement, which allows the user a more natural viewing experience than if the user's head were fixed in a particular position.

In some embodiments accounting for a user's head movement, eye contact detection component 500 includes two or more optical sensors 506. For example, two cameras may be arranged to form a stereo vision system for obtaining a 3D position of the user's eye or eyes; this allows processor 502 to compensate for head movement when determining the user's gaze point. The two or more optical sensors 506 may be part of a single unit or may be separate units. For example, a user device (e.g., user equipment device 300 (FIG. 3)) may include two cameras used as optical sensors 506, or eye contact detection component 500 in communication with the user device (e.g., user equipment device 300 (FIG. 3)) may include two optical sensors 506. In other embodiments, each of the user device (e.g., user equipment device 300 (FIG. 3)) and eye contact detection component 500 may include an optical sensor, and processor 502 receives image data from the optical sensor of the user device and the optical sensor of eye contact detection component 500. Processor 502 may receive data identifying the location of optical sensor 506 relative to a display (e.g., display 312 (FIG. 3)) and/or relative to each other and use this information when determining the gaze point.

In other embodiments accounting for a user's head movement, eye contact detection component 500 includes two or more light sources for generating multiple glints. For example, two light sources 504 may create glints at different locations of an eye; having information on the two glints allows the processor to determine a 3D position of the user's eye or eyes, allowing processor 502 to compensate for head movement. Processor 502 may also receive data identifying the location of light sources 504 relative to a display (e.g., display 312 (FIG. 3)) and/or relative to each other and use this information when determining the gaze point.

In some embodiments, other types of eye contact detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 500.

It should be noted that eye contact detection component 500 is but one type of component that may be incorporated into or accessible by detection module 316 (FIG. 3) or the media guidance application. Other types of components, which may generate other types of data (e.g., video, audio, textual, etc.) are fully within the bounds of this disclosure.

Figure 6:
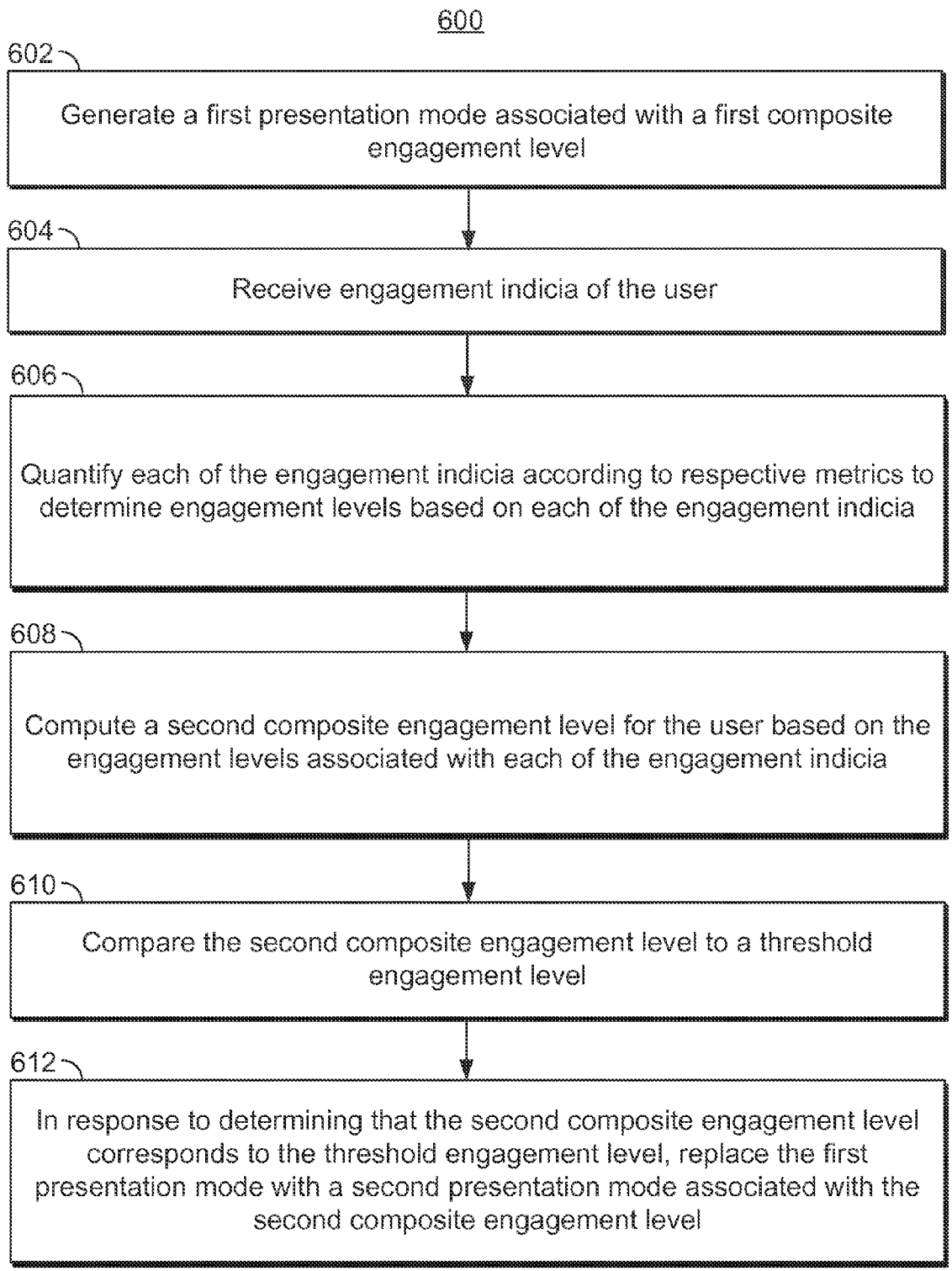
FIG. 6 is a flowchart of illustrative steps involved in generating presentation modes associated with the composite engagement level of a user in accordance with some embodiments of the disclosure.

FIG. 6 is a flowchart of illustrative steps involved in generating presentation modes associated with the composite engagement level of a user. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to provide content as described in the displays of FIGS. 1 and 2A-C. In addition, one or more steps of process 600 may be incorporated into or combined with one or more steps of any other process or embodiment (e.g., process 700 (FIG. 7) or process 800 (FIG. 8).

At step 602, the media guidance application generates a first presentation mode associated with a first composite engagement level. For example, the media guidance application may present content on one of a plurality of modes (e.g., as described in relation to FIGS. 2A-C). For example, the media guidance application may (e.g., via control circuitry 304 (FIG. 3)) select one of a plurality of presentation modes (e.g., display 200 (FIG. 2A), display 220 (FIG. 2B), and/or display 230 (FIG. 2C)) on a display (e.g., display 312 (FIG. 3)) based on the level of engagement of the user that corresponds to the content presented and the interactions required of each individual presentation mode.

For example, the media guidance application may generate a first (e.g., "active") presentation mode (e.g., as shown in FIG. 2A)) that features interactive content, complex menus, and multiple user input interaction types (e.g., remote control, touch-screen, voice control, etc.) if a user is actively engaging (e.g., as determined based on engagement indicia detected by detection module 316 (FIG. 3)) a device (e.g., user equipment device 402, 404, and/or 406 (FIG. 4)) associated with the media guidance application. The media guidance application may generate a second (e.g., "glance") presentation mode (e.g., as shown in FIG. 2B)) that features a ticker-feed, pop-up alerts, etc. with limited user input interaction types (e.g., voice control) if a user is only partially engaging (e.g., glancing at the device every so often) a device associated with the media guidance application. The media guidance application may also generate a third (e.g., "companion") presentation mode (e.g., as shown in FIG. 2C)) that features limited video (e.g., screen savers, information on audio currently playing, etc.) and audio content (e.g., background music) and no user input interaction types (e.g., the media guidance application will need to switch to a different presentation mode in order to recognize any inputs) if a user is not engaging a device associated with the media guidance application.

At step 604, the media guidance application receives engagement indicia of the user. For example, the media guidance application may monitor (e.g., via detection module (e.g., 316 (FIG. 3)) or receive (e.g., from a remote source via communications network 414 (FIG. 4)) engagement indicia relating to the engagement of the user with a user device (e.g., user device 402, 404, and/or 406 (FIG. 4)) associated with the media guidance application. For example, the media guidance application may receive (e.g., via I/O path 302 (FIG. 3)) engagement indicia indicating an amount of concentration or distraction associated with the user by indicating whether or not a user is making eye contact (e.g., based on a gaze point of a user as discussed in relation to FIG. 5).

At step 606, the media guidance application may quantify each of the engagement indicia according to respective metrics to determine engagement levels based on each of the engagement indicium. For example, in response to receiving (e.g., via I/O path 302 (FIG. 3) or via detection module 316 (FIG. 3)) an engagement indicium, the media guidance application (e.g., via control circuitry 304 (FIG. 3)) may cross-reference the engagement indicium in a database (e.g., located locally at storage 308 (FIG. 3) or remotely at a location accessible via communications network 414 (FIG. 4)) associated with metrics for various engagement indicia. The database (or media guidance application) may then filter the information in the database according to the engagement indicium to return results corresponding to the metric used for the engagement indicium. The result may then be outputted to and/or retrieved by the media guidance application.

At step 606, the media guidance application quantifies each of the engagement indicia according to respective metrics to determine engagement levels based on each of the engagement indicium. For example, by comparing (e.g., via control circuitry 304 (FIG. 3)) the received engagement indicium to the appropriate metric the media guidance application may (e.g., via control circuitry 304 (FIG. 3)) quantify the level of engagement of the user based on that engagement indicium. For example, if an engagement indicium relates to whether or not a user is making eye contact (e.g., as determine by analyzing a gaze point of a user as discussed in relation to FIG. 5) with a user device (e.g., user equipment device 402, 404, and/or 406 (FIG. 4)) associated with the media guidance application, the metric may correspond to the amount of time the gaze point of a user is focused on the user device versus the amount of time the gaze point is not focused on the user device. By comparing the engagement indicium to the metric, the media guidance application may (e.g., via control circuitry 304 (FIG. 3)) determine a quantity (e.g., a finite number, ratio, percentage, etc.) that represents the relationship of the engagement indicium to the metric.

At step 608, the media guidance application computes a second composite engagement level for the user based on the engagement levels associated with engagement indicia. For example, based on one or more engagement levels determined in step 606, the media guidance application computes (e.g., via control circuitry 304 (FIG. 3)) a second composite engagement level. For example, if four engagement levels for a user, each associated with respective engagement indicia, correspond to ten percent engagement, ten percent engagement, twenty percent engagement, and forty percent engagement, respectively, the media guidance application may determine that the composite engagement level corresponds to twenty percent.

At step 610, the media guidance application compares the second composite engagement level to a threshold engagement level. For example, the media guidance application may retrieve/receive a threshold engagement level (e.g., from local storage 308 (FIG. 3) or remote storage accessible via communications network 414 (FIG. 4)) that indicates a particular level of engagement necessary for the media guidance application to present a particular mode (e.g., a second presentation mode) or a particular level of engagement necessary to trigger the media guidance application to replace and/or modify a current mode (e.g., a first presentation mode).

For example, the composite engagement level for a user (e.g., as determined in step 608 by the media guidance application) may correspond to twenty percent. The threshold engagement level associated with the current presentation mode (e.g., display 220 (FIG. 2B)) may correspond to a minimum of thirty percent engagement. The media guidance application may determine whether or not the composite engagement level of the user (e.g., determined in step 608) corresponds to the threshold engagement level.

At step 612, the media guidance application replaces the first presentation mode with a second presentation mode associated with the second composite engagement level in response to determining that the second engagement level corresponds to the threshold engagement level. For example, if the composite engagement level for a user (e.g., as determine in step 608 by the media guidance application) corresponds to twenty percent, and the threshold engagement level associated with the current mode (e.g., display 220 (FIG. 2B)) corresponds to a minimum of thirty percent engagement, the media guidance application (e.g., via control circuitry 304 (FIG. 3)) may replace the current presentation mode (e.g., display 220 (FIG. 2B)) with a presentation mode corresponding to a lower level of engagement (e.g., display 230 (FIG. 2C)).

In some embodiments, the media guidance application may select (e.g., via control circuitry 304 (FIG. 3)) a particular presentation mode based on the current composite engagement level of the user. For example, in response to determining that the composite engagement level of the user is thirty percent, the media guidance application may (e.g., via control circuitry 304 (FIG. 3)) determine the presentation mode that corresponds to, or that has a threshold engagement level that corresponds to, thirty percent (e.g., via cross-referencing the current composite engagement level with a database listing the threshold engagement levels associated with each presentation mode).

Additionally or alternatively, the media guidance application may perform one or more iterations of process 600, each time comparing a current presentation mode to a current composite engagement level until the media guidance application settles on a presentation mode corresponding to the current composite engagement level. For example, if the composite engagement level for a user (e.g., as determined in step 608 by the media guidance application) corresponds to forty percent, and the threshold engagement level associated with the current mode (e.g., display 220 (FIG. 2B)) corresponds to a maximum level of thirty percent engagement, the media guidance application (e.g., via control circuitry 304 (FIG. 3)) may replace the current presentation mode (e.g., display 220 (FIG. 2B)) with a presentation mode corresponding to a higher level of engagement (e.g., display 200 (FIG. 2A)). The media guidance application may then compare the threshold engagement level associated with the new presentation mode to determine if that presentation mode will be maintained.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
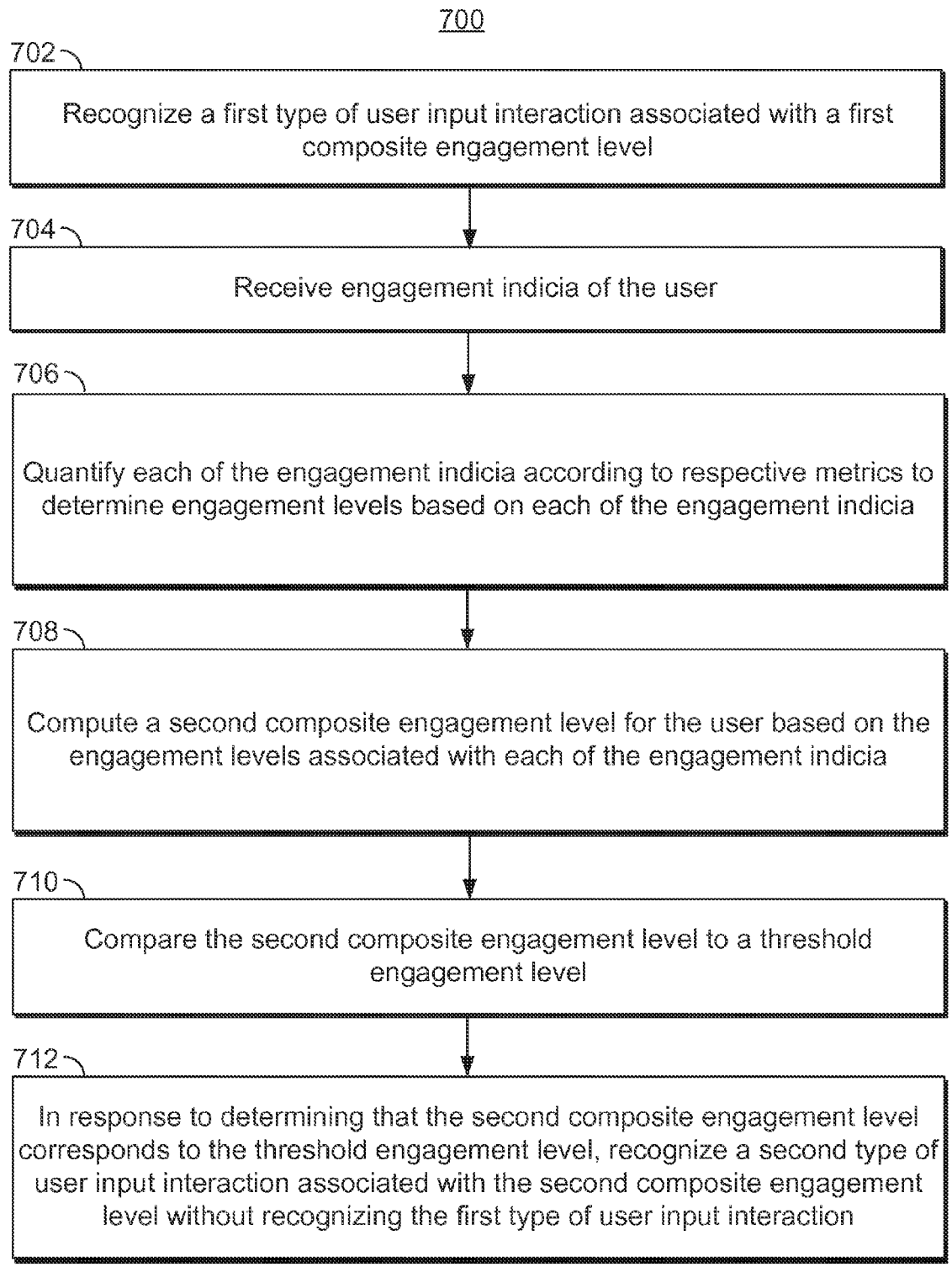
FIG. 7 is a flowchart of illustrative steps involved in recognizing types of user input interaction associated with the composite engagement level of a user in accordance with some embodiments of the disclosure.
Figure 8:
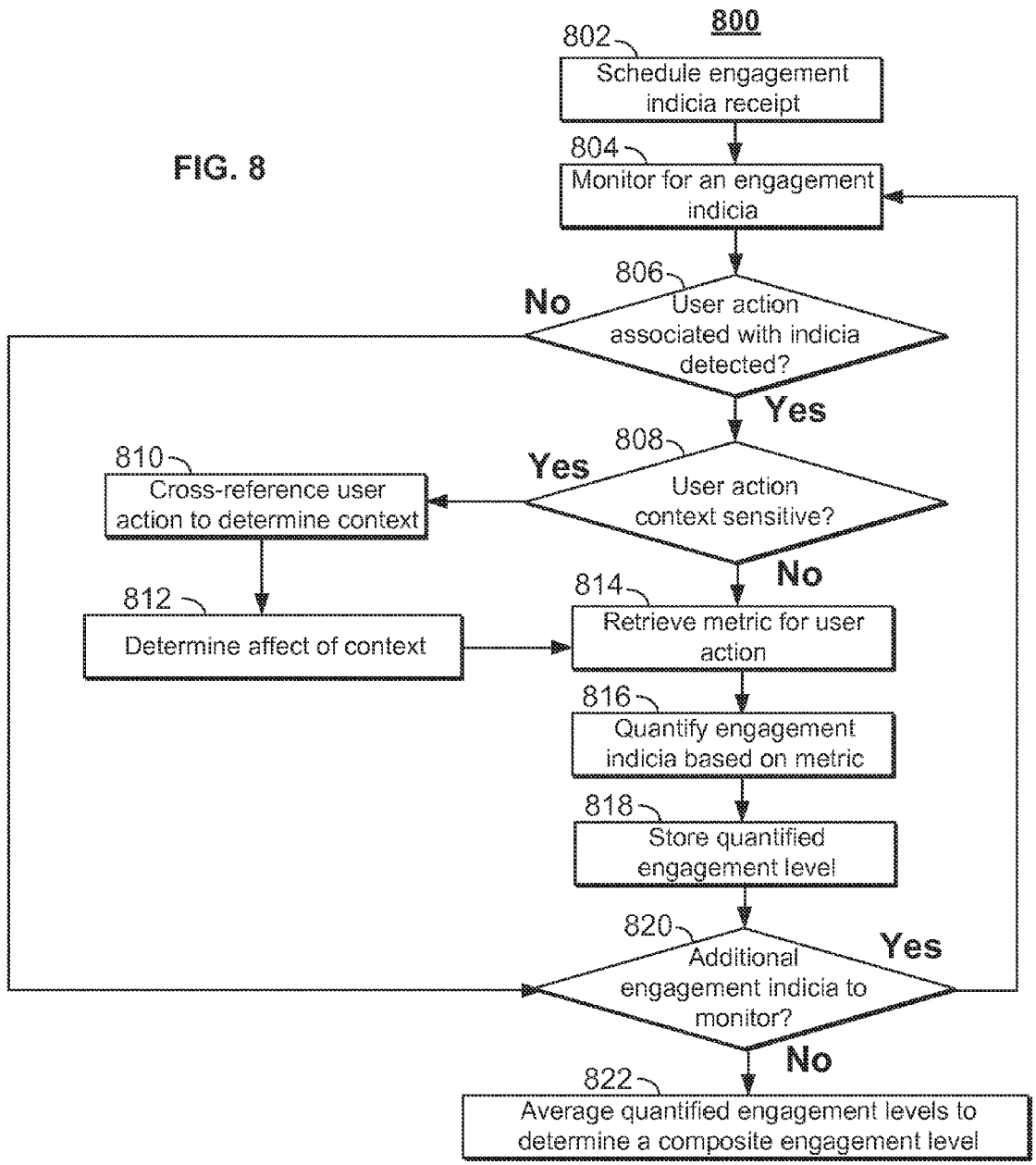
FIG. 8 is a flowchart of illustrative steps involved in determining a composite engagement level in accordance with some embodiments of the disclosure.

FIG. 7 is a flowchart of illustrative steps involved in recognizing types of user input interaction associated with the composite engagement level of a user. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to provide content as described in the displays of FIGS. 1 and 2A-C. In addition, one or more steps of process 700 may be incorporated into or combined with one or more steps of any other process or embodiment (e.g., process 600 (FIG. 6) or process 800 (FIG. 8).

At step 702, the media guidance application recognizes a first type of user input interaction associated with a first composite engagement level. For example, the media guidance application may respond only to commands received through particular user input interfaces (e.g., user input interface 310 (FIG. 3)) associated with particular input means (e.g., a keyboard but not a remote control) or particular commands of the commands available through the particular user input interface (e.g., only volume up/down commands and not menu navigation commands) as described in relation to FIGS. 2A-C. For example, the media guidance application may (e.g., via control circuitry 304 (FIG. 3)) recognize only user input interaction types associated with a current presentation mode (e.g., display 200 (FIG. 2A), display 220 (FIG. 2B), and/or display 230 (FIG. 2C)) on a display (e.g., display 312 (FIG. 3)), and/or based on the level of engagement of the user that corresponds to the interactions required of each individual presentation mode.

For example, the media guidance application may generate a first (e.g., "active") presentation mode (e.g., as shown in FIG. 2A)) that features interactive content, complex menus, and multiple user input interaction types (e.g., remote control, touch-screen, voice control, etc.) if a user is actively engaging (e.g., as determined based on engagement indicia detected by detection module 316 (FIG. 3)) a device (e.g., user equipment devices 402, 404, and/or 406 (FIG. 4)) associated with the media guidance application. The media guidance application may generate a second (e.g., "glance") presentation mode (e.g., as shown in FIG. 2B)) that features ticker-feeds, pop-up alerts, etc. with limited user input interaction types (e.g., voice control) if a user is only partially engaging (e.g., glancing at the device every so often) a device associated with the media guidance application. The media guidance application may also generate a third (e.g., "companion") presentation mode (e.g., as shown in FIG. 2C)) that features limited video (e.g., screen savers, information on audio currently playing, etc.) and audio content (e.g., background music) and no user input interaction types (e.g., the media guidance application will need to switch to a different presentation mode in order to recognize any inputs) if a user is not engaging a device associated with the media guidance application.

At step 704, the media guidance application receives engagement indicia of the user. For example, the media guidance application may monitor (e.g., via detection module (e.g., 316 (FIG. 3)) or receive (e.g., from a remote source via communications network 414 (FIG. 4)) engagement indicia relating to the engagement of the user with a user device (e.g., user device 402, 404, and/or 406 (FIG. 4)) associated with the media guidance application. For example, the media guidance application may receive (e.g., via I/O path 302 (FIG. 3)) engagement indicia indicating an amount of concentration or distraction associated with the user by indicating whether or not a user is making eye contact (e.g., based on a gaze point of a user as discussed in relation to FIG. 5).

At step 706, the media guidance application may quantify each of the engagement indicia according to respective metrics to determine engagement levels based on each of the engagement indicium. For example, in response to receiving (e.g., via I/O path 302 (FIG. 3) or via detection module 316 (FIG. 3)) an engagement indicium, the media guidance application (e.g., via control circuitry 304 (FIG. 3)) may cross-reference the engagement indicium in a database (e.g., located locally at storage 308 (FIG. 3) or remotely at a location accessible via communications network 414 (FIG. 4)) associated with metrics for various engagement indicia. The database (or media guidance application) may then filter the information in the database according to the engagement indicium to return results corresponding to the metric used for the engagement indicium. The result may then be outputted to and/or retrieved by the media guidance application.

At step 706, the media guidance application quantifies each of the engagement indicia according to respective metrics to determine engagement levels based on each of the engagement indicium. For example, by comparing (e.g., via control circuitry 304 (FIG. 3)) the received engagement indicium to the appropriate metric the media guidance application may (e.g., via control circuitry 304 (FIG. 3)) quantify the level of engagement of the user based on that engagement indicium. For example, if engagement indicia relates to whether or not a user is making eye contact (e.g., as determine by analyzing a gaze point of a user as discussed in relation to FIG. 5) with a user device (e.g., user equipment device 402, 404, and/or 406 (FIG. 4)) associated with the media guidance application, the metric may correspond to the amount of time the gaze point of a user is focused on the user device versus the amount of time the gaze point is not focused on the user device. By comparing the engagement indicium to the metric, the media guidance application may (e.g., via control circuitry 304 (FIG. 3)) determine a quantity (e.g., a finite number, ratio, percentage, etc.) that represents the relationship of the engagement indicium to the metric.

At step 708, the media guidance application computes a second composite engagement level for the user based on the engagement levels associated with the engagement indicium. For example, based on one or more engagement levels determined in step 706, the media guidance application computes (e.g., via control circuitry 304 (FIG. 3)) a second composite engagement level. For example, if three engagement levels for a user, each associated with respective engagement indicia, correspond to "high" engagement, "low" engagement, and "normal" engagement, respectively, the media guidance application may determine that the composite engagement level corresponds to "normal" engagement.

At step 710, the media guidance application compares the second composite engagement level to a threshold engagement level. For example, the media guidance application may retrieve/receive a threshold engagement level (e.g., from local storage 308 (FIG. 3) or remote storage accessible via communications network 414 (FIG. 4)) that indicates a particular level of engagement necessary for the media guidance application to present a particular mode (e.g., a second presentation mode) or a particular level of engagement necessary to trigger the media guidance application replace and/or modify a current mode (e.g., a first presentation mode).

For example, the composite engagement level for a user (e.g., as determined in step 708 by the media guidance application) may correspond to twenty percent. The threshold engagement level associated with the current mode (e.g., display 220 (FIG. 2B)) may correspond to a minimum of thirty percent engagement. The media guidance application may determine whether or not the composite engagement level of the user (e.g., determined in step 708) corresponds to the threshold engagement level.

At step 712, the media guidance application recognizes a second type of user input interaction associated with the second composite engagement level without recognizing the first type of user input interaction in response to determining that the second composite engagement level corresponds to the threshold engagement level. For example, if the composite engagement level for a user (e.g., as determined in step 708 by the media guidance application) corresponds to twenty percent, and the threshold engagement level associated with the current mode (e.g., display 220 (FIG. 2B)) corresponds to a minimum of thirty percent engagement, the media guidance application (e.g., via control circuitry 304 (FIG. 3)) may replace the current mode (e.g., display 220 (FIG. 2B)) with a mode corresponding to a lower level of engagement (e.g., display 230 (FIG. 2C)).

In some embodiments, the media guidance application may select (e.g., via control circuitry 304 (FIG. 3)) a particular mode based on the current composite engagement level of the user. For example in response to determining that the composite engagement level of the user is thirty percent, the media guidance application may (e.g., via control circuitry 304 (FIG. 3)) determine the mode that corresponds to, or that has a threshold engagement level that corresponds to, thirty percent (e.g., via cross-referencing the current composite engagement level with a database listing the threshold engagement levels associated with each mode).

Additionally or alternatively, the media guidance application may perform one or more iterations of process 700, each time comparing a current mode to a current composite engagement level until the media guidance application settles on a mode corresponding to the current composite engagement level. For example, if the composite engagement level for a user (e.g., as determined in step 708 by the media guidance application) corresponds to forty percent, and the threshold engagement level associated with the current mode (e.g., display 220 (FIG. 2B)) corresponds to a maximum level of thirty percent engagement, the media guidance application (e.g., via control circuitry 304 (FIG. 3)) may replace the current mode (e.g., display 220 (FIG. 2B)) with a mode corresponding to a higher level of engagement (e.g., display 200 (FIG. 2A)). The media guidance application may then compare the threshold engagement level associated with the new mode to determine if that mode will be maintained.

Accordingly, during each mode, the media guidance application may only recognize only a specific type or types of user input interaction. For example, in order to reduce false positive inputs as discussed above, the media guidance application may only recognize specific types of user input interaction, and in order for a user to access disabled user input interaction types, the media guidance application may first need to determine that the engagement level of the user has increased/decreased.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one of more of the steps in FIG. 7.

FIG. 8 is a flowchart of illustrative steps involved in determining a composite engagement level. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to provide content as described in the displays of FIGS. 1 and 2A-C. In addition, one or more steps of process 800 may be incorporated into or combined with one or more steps of any other process or embodiment (e.g., process 600 (FIG. 6) or process 700 (FIG. 7)).

At step 802, the media guidance application schedules a receipt of engagement indicia. For example, the media guidance application may receive (e.g., via I/O path 302 (FIG. 3)) and/or monitor (e.g., via detection module 316 (FIG. 3)) for engagement indicia based on a predetermined schedule (e.g., continuously, sporadically, every hour, etc.) or may receive/monitor for engagement indicia based on a user action (e.g., a user request to monitor, a user request to access or disable a type of user input interaction, etc.) or user inactions (e.g., after a period of inactivity).

At step 804, the media guidance application monitors for an engagement indicium. For example, the media guidance application may monitor (e.g., via detection module 316 (FIG. 3)) for any user actions (or lack of user actions) that indicates an engagement indicium. For example, the media guidance application may monitor for the presence of a user in a viewing area of a user device (e.g., user equipment device 402, 404, and/or 406 (FIG. 4)) associated with a media guidance. For example, the lack of a user in the viewing area, may be a strong indication that the user is not engaged.

At step 806, the media guidance application determines whether or not a user action associated with engagement indicia is detected. If so, the media guidance application proceeds to step 808. If not, the media guidance application proceeds to step 820 and determines if there are any additional engagement indicia to monitor. At step 808, the media guidance application determines whether or not the user action is context sensitive. For example, in some cases, the context of a user action may bear on whether or not the user is engaged. For example, if a user is talking to another user the context of the conversation may bear on whether or not the users are engaged. For example, if the conversation relates to circumstances of content presented by the media guidance application such as a recent ticker (e.g., ticker 226 (FIG. 2B)) update, the media guidance application may determine (e.g., via control circuitry 304 (FIG. 3)) that the conversation indicates the users are more heavily engaged. In contrast, if the conversation does not relate to content presented by the media guidance application, the media guidance application may determine (e.g., via control circuitry 304 (FIG. 3)) that the conversation indicates the users are less engaged.

If the user action is context sensitive, the media guidance application proceed to step 810 and cross-references the user action in a database associated with contexts of user actions to determine whether a context associated with the user action indicates how the user action corresponds to one or more of the engagement indicia. For example, in response to receiving (e.g., via I/O path 302 (FIG. 3) or via detection module 316 (FIG. 3)) a context sensitive user action, the media guidance application (e.g., via control circuitry 304 (FIG. 3)) may cross-reference the user action or data associated with the user action (e.g., keywords of a conversation between users) in a database (e.g., located locally at storage 308 (FIG. 3) or remotely at a location accessible via communications network 414 (FIG. 4)) associated with contexts for user actions. The database (or media guidance application) may then filter the information in the database according to the data to return results corresponding to whether or not the data indicates a user is more or less engaged (or an amount of engagement). The result and/or affect of the context may then be outputted to and/or retrieved by the media guidance application to determine an affect of the effect of the context of the user action on the engagement indicia at step 812. For example, the media guidance application may (e.g., based on the cross-reference) determine that a user action stating, "this is boring," may indicate that the user is less engaged, while a user action stating, "this is awesome," may indicate that the user is more engaged.

In some embodiments, the media guidance application may also receive a context associated with a media asset and/or advertisement presented by the media guidance application. For example, the media guidance application may retrieve keywords from closed captioning data and determine if those keywords match keywords spoken by a user. If so, the media guidance application may (e.g., based on a match) determine that a user action indicates that the user is more engaged, whereas the media guidance application may (e.g., based on no matches) determine that the user action indicates that the user is less engaged.

In some embodiments, the media guidance application may (e.g., via control circuitry 304 (FIG. 3)) determine a likelihood that the context associated with the user action indicates how the user action corresponds to the one or more of the engagement indicia and compares the likelihood to a threshold likelihood. In response to determining that the likelihood does not correspond to the threshold likelihood, the media guidance application may (e.g., via control circuitry 304 (FIG. 3)) determine the context associated with the user action does not indicate how the user action corresponds to one or more of the engagement indicia. For example, the media guidance application may determine whether it is more likely that a user is using a second device to view information related to content generated for display by the media guidance application on a first device (e.g., an indicator that the user is more engaged) or that the user is using the second device to view information that is not related to content generated for display by the media guidance application on the first device (e.g., an indicator that the user is less engaged).

In some embodiments, the media guidance application may receive a likelihood that the context associated with the user action indicates how the user action corresponds to the one or more of the engagement indicia from the database (e.g., located locally at storage 308 (FIG. 3) or remotely at a location accessible via communications network 414 (FIG. 4)) associated with contexts for user actions. For example, the database, in addition to returning results corresponding to the whether or not the data indicates a user is more or less engaged (or an amount of engagement), the results may also indicate the likelihood the data indicates a user is more or less engaged (or an amount of engagement). The likelihood of the affect of the context may then be outputted to and/or retrieved by the media guidance application.

In some embodiments, the determined likelihood may also be compared to a threshold likelihood. For example, a threshold likelihood may indicate the degree to which the likelihood that the context associated with the user action indicates an effect or an amount of an effect on a user engagement level. For example, in response to determining that there is a seventy percent chance that the context of a user action (e.g., spoken words of a user) indicates the user is engaged, the media guidance application (e.g., via control circuitry 304 (FIG. 3)) may compare this amount to a threshold likelihood (e.g., received/retrieved from storage 308 (FIG. 3) or any location accessible via communications network 414 (FIG. 4)).

If the likelihood corresponds to the threshold likelihood (e.g., the threshold likelihood requires a minimum likelihood of sixty percent), the media guidance application determines that the context associated with the user action indicates how the user action corresponds to the one or more of the engagement indicia. Accordingly, the media guidance application may use the user action (and the context thereof) to determine the engagement level of the user. If the likelihood does not correspond to the threshold likelihood (e.g., the threshold likelihood requires a minimum likelihood of eighty percent), the media guidance application determines that the context associated with the user action does not indicate how the user action corresponds to the one or more of the engagement indicia. Accordingly, the media guidance application does not use the user action (and the context thereof) to determine the engagement level of the user.

At step 814, the media guidance application retrieves the metric for the user action. For example, as discussed above, in response to receiving (e.g., via I/O path 302 (FIG. 3) or via detection module 316 (FIG. 3)) an engagement indicium, the media guidance application (e.g., via control circuitry 304 (FIG. 3)) may cross-reference the engagement indicium in a database (e.g., located locally at storage 308 (FIG. 3) or remotely at a location accessible via communications network 414 (FIG. 4)) associated with metrics for various engagement indicia. The database (or media guidance application) may then filter the information in the database according to the engagement indicium to return results corresponding to the metric used for the engagement indicium. The result may then be outputted to and/or retrieved by the media guidance application.

At step 816, the media guidance application quantifies the engagement indicia based on the metric to determine an engagement level associated with the user for that engagement indicium. For example, as discussed above in step 606 (FIG. 6) and step 706 (FIG. 7), by comparing (e.g., via control circuitry 304 (FIG. 3)) the engagement indicium to the metric the media guidance application may (e.g., via control circuitry 304 (FIG. 3)) quantify the level of engagement of the user based on that engagement indicium. For example, the media guidance application may (e.g., via control circuitry 304 (FIG. 3)) determine a quantity (e.g., a finite number, ratio, percentage, etc.) that represents the engagement level of the user with respect to the particular engagement indicium.

At step 818, the media guidance application stores the quantified engagement level. For example, the media guidance application may receive (e.g., via detection module 316 (FIG. 3)) a plurality of engagement indicia for a user. The media guidance application may (e.g., via control circuitry 304 (FIG. 3)) determine engagement levels for each respective engagement indicium. The media guidance application may then store (even temporarily) the quantified engagement levels for each engagement indicium (e.g., at storage 308 (FIG. 3) or at any location accessible via control circuitry 414 (FIG. 4)).

If not, the media guidance application proceeds to step 820 and determines if there are any additional engagement indicia to monitor. If the media guidance application determines (e.g., via control circuitry 304 (FIG. 3)) at step 820 that there are additional engagement indicia to monitor, the media guidance application returns to step 804. If not, the media guidance application proceeds to step 822.

At step 822, the media guidance application averages the stored quantified engagement levels to determine a composite engagement level. For example, the media guidance application retrieves the one or more stored quantified engagement levels and computes (e.g., via control circuitry 304 (FIG. 3)) a composite engagement level based on the stored quantified engagement levels. For example, if stored quantified engagement levels for a user, each associated with different engagement indicia, correspond to quantities of three, one, and two, respectively, the media guidance application may determine that the composite engagement level corresponds to two.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one of more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for adjusting presentation modes based on actively determining an engagement level of a user, the method comprising:
   generating a first presentation mode associated with a first composite engagement level;
   receiving engagement indicia of the user;
   quantifying each of the engagement indicium according to respective metrics to determine engagement levels based on each of the engagement indicium;
   computing a second composite engagement level for the user based on the engagement levels associated with each of the engagement indicium;
   comparing the second composite engagement level to a threshold engagement level; and
   in response to determining that the second composite engagement level corresponds to the threshold engagement level, replacing the first presentation mode with a second presentation mode associated with the second composite engagement level;
   generating a display of a ticker feed featuring updates from a social media account associated with the user in the second presentation mode.

2. The method of claim 1, wherein the first presentation mode and the second presentation mode are associated with different audio or video presentation capabilities, and wherein the first presentation mode and the second presentation mode are associated with a display of different media assets based on the different audio or video presentation capabilities.

3. The method of claim 1, wherein the respective metrics for each of the engagement indicium are different.

4. The method of claim 1, wherein the engagement indicia indicate the engagement level of the user with respect to a user device generating the first presentation mode.

5. The method of claim 1, further comprising cross-referencing a user action with a database associated with contexts of user actions to determine whether a context associated with the user action indicates how the user action corresponds to one or more of the engagement indicium.

6. The method of claim 5, further comprising:
   determining a likelihood that the context associated with the user action indicates how the user action corresponds to the one or more of the engagement indicium;
   comparing the likelihood to a threshold likelihood; and
   in response to determining that the likelihood does not correspond to the threshold likelihood, determining that the context associated with the user action does not indicate how the user action corresponds to the one or more of the engagement indicium.

7. The method of claim 1, further comprising:
   generating transition information, wherein the transition information identifies what content is being presented while the first type of user input interaction is recognized, what length of time the first type of user input interaction is recognized, or what time of day the first type of user input interaction is recognized; and
   transmitting the transition information to a remote server.

8. The method of claim 1, wherein a first engagement indicium is eye contact of the user and quantifying the eye contact of the user includes measuring a length of time that the user is making eye contact with a display of a first media asset during a period of time, and wherein a second engagement indicium is an input amount and quantifying user inputs includes determining a number of times that the user enters a user input during the period of time.

9. The method of claim 1, wherein the respective metrics are calibrated to the user.

10. A system for adjusting presentation modes based on actively determining an engagement level of a user, the system comprising control circuitry that:
    generates a first presentation mode associated with a first composite engagement level;
    receives engagement indicia of the user;
    quantifies each of the engagement indicium according to respective metrics to determine engagement levels based on each of the engagement indicium;
    computes a second composite engagement level for the user based on the engagement levels associated with each of the engagement indicium;
    compares the second composite engagement level to a threshold engagement level; and
    in response to determining that the second composite engagement level corresponds to the threshold engagement level, replaces the first presentation mode with a second presentation mode associated with the second composite engagement level
    generates a display of a ticker feed featuring updates from a social media account associated with the user in the second presentation mode.

11. The system of claim 10, wherein the first presentation mode and the second presentation mode are associated with different audio or video presentation capabilities, and wherein the first presentation mode and the second presentation mode are associated with a display of different media assets based on the different audio or video presentation capabilities.

12. The system of claim 10, wherein the respective metrics for each of the engagement indicium are different.

13. The system of claim 10, wherein the engagement indicia indicate the engagement level of the user with respect to a user device generating the first presentation mode.

14. The system of claim 10, wherein the control circuitry further cross-references a user action with a database associated with contexts of user actions to determine whether a context associated with the user action indicates how the user action corresponds to one or more of the engagement indicium.

15. The system of claim 14, wherein the control circuitry further:
    determines a likelihood that the context associated with the user action indicates how the user action corresponds to the one or more of the engagement indicium;
    compares the likelihood to a threshold likelihood; and
    in response to determining that the likelihood does not correspond to the threshold likelihood, determines that the context associated with the user action does not indicate how the user action corresponds to the one or more of the engagement indicium.

16. The system of claim 10, wherein the control circuitry further:
- generates transition information, wherein the transition information identifies what content is being presented while the first type of user input interaction is recognized, what length of time the first type of user input interaction is recognized, or what time of day the first type of user input interaction is recognized; and
- transmits the transition information to a remote server.

17. The system of claim 10, wherein a first engagement indicium is eye contact of the user and the control circuitry that quantifies the eye contact of the user includes control circuitry that measures a length of time that the user is making eye contact with a display of a first media asset during a period of time, and wherein a second engagement indicium is an input amount and the control circuitry that quantifies user inputs includes control circuitry that determines a number of times that the user enters a user input during the period of time.

18. The system of claim 10, wherein the respective metrics are calibrated to the user.

* * * * *